(12) United States Patent
Cunningham et al.

(10) Patent No.: US 6,430,230 B1
(45) Date of Patent: Aug. 6, 2002

(54) METHODS OF ENCODING PAYLOAD BITS FOR TRANSMISSION

(75) Inventors: David George Cunningham, Wickwar; Alistair Neil Coles, Bath, both of (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/343,630

(22) Filed: Jun. 30, 1999

(30) Foreign Application Priority Data

Jul. 7, 1998 (EP) .............................. 98305393

(51) Int. Cl.$^7$ ................................ H04L 25/49
(52) U.S. Cl. ................ 375/292; 714/800; 714/802; 714/809
(58) Field of Search ................ 375/253, 254, 375/292, 265; 714/755, 759, 800, 802, 803, 809; 341/58, 76

(56) References Cited

U.S. PATENT DOCUMENTS

| | | | | |
|---|---|---|---|---|
| 4,617,553 A | * | 10/1986 | Webster et al. ............. | 341/58 |
| 4,796,260 A | * | 1/1989 | Schilling et al. ............ | 714/755 |
| 5,010,554 A | * | 4/1991 | Bechtel et al. .............. | 714/759 |
| 5,396,503 A | * | 3/1995 | Thaler et al. ............... | 714/809 |
| 5,635,933 A | * | 6/1997 | Fitzpatrick et al. .......... | 341/58 |
| 6,199,190 B1 | * | 3/2001 | Wan ........................... | 714/786 |
| 6,333,704 B1 | * | 12/2001 | Jung et al. .................... | 341/58 |

FOREIGN PATENT DOCUMENTS

| | | |
|---|---|---|
| GB | 2291315 | 7/1994 |
| WO | WO92/22160 | 5/1992 |
| WO | WO95/02283 | 7/1994 |

* cited by examiner

Primary Examiner—Young T. Tse

(57) ABSTRACT

In a method for encoding payload bits for transmission over communications link, data and control information are assembled into n-bit data words, where n is an even number and words for control information are constrained to have zero disparity (equal numbers of binary zero and one digits). The n-bit data words are then encoded into n+2-bit code words by adding a two-bit label; for words carrying control information the label has a value of 10. For other data words the disparity is evaluated; if it is zero, the label bits are 01; if the disparity is non-zero and opposite in sense to the running digital sum of the code words transmitted already, the label bits are 11; otherwise, the data word is inverted, and the label bits are 00.

2 Claims, 4 Drawing Sheets

| Label a | Label b | Payload (n bits) |
|---|---|---|

| Payload type | Payload weight | Overall RDS | Label bit a | Label bit b | Invert payload? |
|---|---|---|---|---|---|
| Data | +ve | -ve | 1 | 1 | No |
| Data | +ve | +ve | 0 | 0 | Yes |
| Data | -ve | -ve | 0 | 0 | Yes |
| Data | -ve | +ve | 1 | 1 | No |
| Data | 0 | - | 0 | 1 | No |
| Control | 0 (selected) | - | 1 | 0 | No |

Fig.2

| Label a | Label b | Payload (n bits) |
|---|---|---|

| Payload type | Payload weight | Overall RDS | Label bit a | Label bit b | Invert payload? |
|---|---|---|---|---|---|
| Data | +ve | -ve | 1 | 1 | No |
| Data | +ve | +ve | 0 | 0 | Yes |
| Data | -ve | -ve | 0 | 0 | Yes |
| Data | -ve | +ve | 1 | 1 | No |
| Data | 0 | - | 0 | 1 | No |
| Control | 0 (selected) | - | 1 | 0 | No |

Fig.5

| Property | $n = 8$ | $n = 16$ | $n = 32$ |
|---|---|---|---|
| Efficiency (%) | 75 | 87.5 | 93.75 |
| Max. control words | 70 | 12,870 | >>100,000 |
| Readily-implemented control words | 16 | 256 | 65,536 |
| RDS bounds | +/- 14 | +/- 26 | +/- 50 |
| Max. run-length (bits) | 22 | 42 | 82 |
| Latency (bits) | 8 | 16 | 32 |

METHODS OF ENCODING PAYLOAD BITS FOR TRANSMISSION

TECHNICAL FIELD

This invention relates to methods of encoding payload bits (e.g. representing data or control information) for transmission over a communications link.

BACKGROUND ART

The spread of personal computers and workstations has led to the development of networks for interconnecting such equipment and common resources such as printers and data storage devices. More powerful and sophisticated computing equipment and programs have progressively become available, allowing the processing of data in larger and larger quantities, for example in the form of database information and graphic images. These developments have placed increasing demands on the speed and capacity of network communications links.

For various reasons it has been found desirable to encode data prior to transmission over communications links, in particular:

to ensure that certain minimum error detection capabilities are provided;

to provide uniquely identifiable control signals which can be embedded in the encoded symbol stream;

to assist in maintaining synchronisation of circuit operation (for example by avoiding prolonged sequences of symbols without any signal transition); and to limit undesired electro-magnetic emissions from conductors, and, even in the case of optical systems, from transceivers and chipsets.

It is also usually desirable to avoid significant imbalance or disparity in the occurrence of differently-valued symbols (e.g. positive and negative polarity symbols), to avoid problems of transmission through systems having a.c. coupling, such as through isolating transformers. Various codes have been proposed and adopted which attempt to balance these objectives relative to one another.

As communication link speeds rise, another issue to be considered in the design of a code is its efficiency, i.e. the ratio between the number of data symbols in a data word and the number of code symbols in the corresponding code word. Any reduction in efficiency results in the need for faster circuit operation to maintain a given rate of transfer of actual data (i.e. the date prior to encoding). At higher communications speeds (e.g. 10 Gbit/s) in particular it is therefore desirable to keep the efficiency as high as possible, to avoid circuit operation at or beyond the capabilities of current technology at reasonable cost.

It is an object of this invention to provide a method of encoding data which facilitates achieving a balance between these different and partially conflicting requirements.

DISCLOSURE OF INVENTION

According to one aspect of this invention there is provided a method of encoding payload bits for transmission over a communications link such that the running disparity of the transmitted symbol stream is constrained within a predetermined limit, and said payload bits comprising either data or control information, comprising the steps of:

assembling an even number of payload bits into a data block, said payload bits being constrained to have zero disparity in the case where they comprise control information;

deriving the disparity of the data block;

if the disparity of the data block is non-zero and of the same sense as the running disparity of the transmitted symbol stream, inverting the bits in the data block and assigning a first value to a plurality of label bits;

if the disparity of the data block is non-zero and of opposite sense to the running disparity of the transmitted symbol stream, assigning a second value to the plurality of label bits;

if the disparity of the data block is zero and the payload bits constitute data, assigning a third value to the plurality of label bits;

if the payload bits comprise control information, assigning a fourth value to the plurality of label bits; and transmitting the payload and label bits in the symbol stream and deriving the running disparity of the transmitted symbol stream.

BRIEF DESCRIPTION OF DRAWINGS

A method of encoding payload bits for transmission over a communications link in accordance with this invention will now be described, by way of example, with reference to the accompanying drawings, in which:

FIG. 2 is a table defining the rules for implementing the encoding procedure;

FIG. 5 is a table showing selected properties of codes of different code word lengths and derived in accordance with these rules.

BEST MODE FOR CARRYING OUT THE INVENTION, & INDUSTRIAL APPLICABILITY

The present invention may be used in circumstances where a stream of data is communicated over one or more channels; if more than one channel is used, successive portions of the data stream are communicated simultaneously over different respective channels in order to obtain a higher bandwidth than would be possible if all the data were transmitted over a single such channel. For convenience the invention will be described in the context of transmission of data over an optical fibre cable. In practice the cable would, for example, form part of a network connecting many stations or nodes, such as personal computers, workstations, multi-user computers, printers or data storage units. Circuit devices associated with these stations would provide the necessary functions for assembling data and network operating information into frames or packets for transmission, for controlling access to the network and for transmitting and receiving physical signals on the cable. The present invention is independent of the particular details of these functions and may for example be implemented in conjunction with existing network technologies; since such technologies already incorporate known techniques for providing these functions, and the functions form no part of the present invention, they will not be described here.

Figure 1:
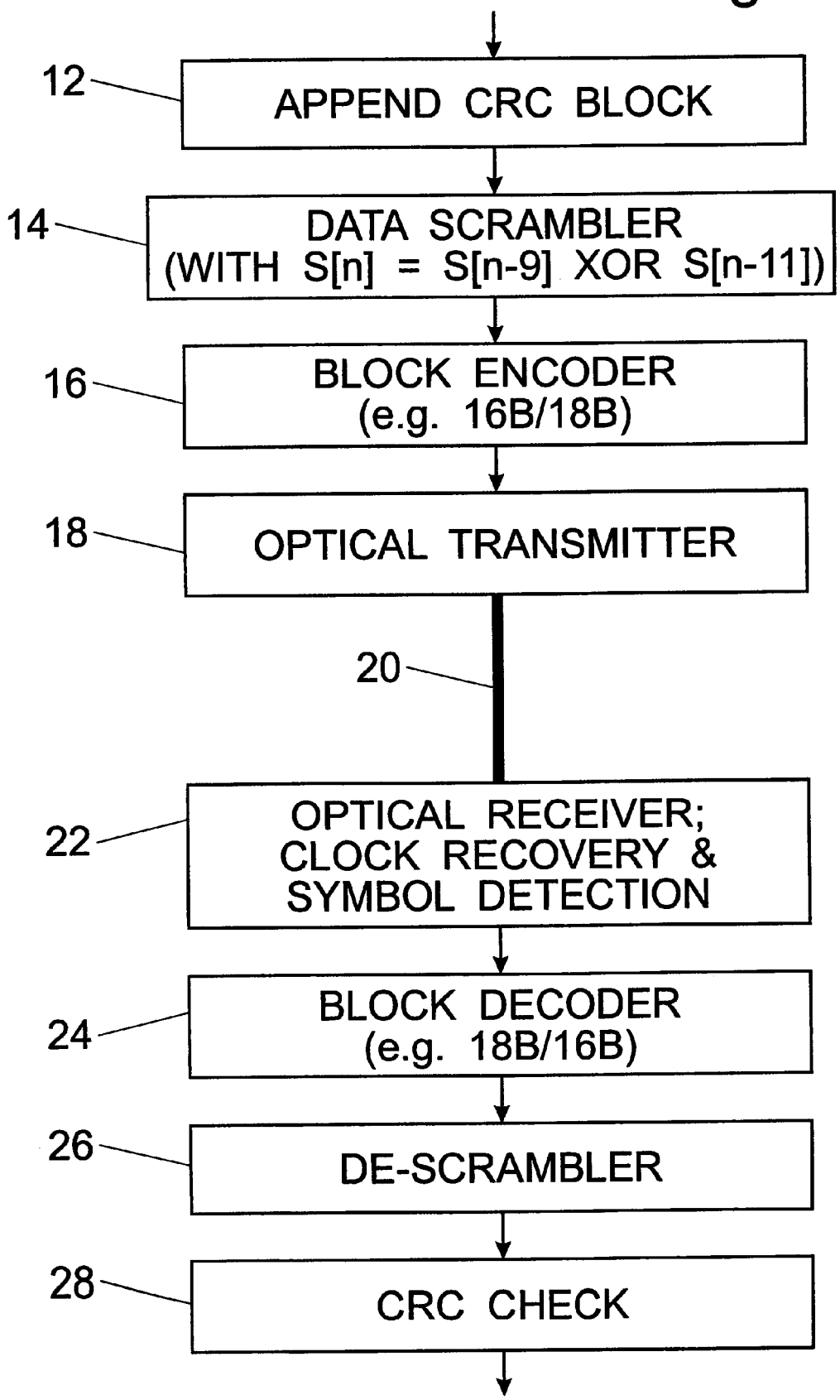
FIG. 1 shows an arrangement for encoding and communicating data over an optical fibre link.

Referring to FIG. 1, a data frame intended to be communicated over an optical fibre channel 20 typically comprises a binary digital message (payload) to be transferred between stations on the network; this message may comprise user data, or control information for managing operation of the network and its components. A circuit 12 generates an associated cyclic redundancy check (CRC) block containing check data derived from this message in known manner in accordance with a predetermined CRC algorithm, and appends the CRC block to the message.

Prior to transmission the contents of the data frame are scrambled by a scrambler 14 in a known predetermined and reversible manner, by combination with a pseudo-random binary sequence (PRBS). This ensures that the energy of the signal propagating over the channel 20 and its associated circuitry is distributed reasonably uniformly throughout the intended bandwidth of the signal, irrespective of any repetitive bit patterns which may occur in the data frame. The PRBS is generated, for example, according to the bit recurrence relation $$S[n]=S[n-9]XOR\ S[n-11]$$

using an 11-stage shift register and an exclusive-OR gate which combines the bit values from the ninth and eleventh stages of the register and feeds back to its first stage. The bit sequence appearing at the fifth stage of the register is combined with the bits of the data frame 10 by another exclusive-OR gate to generate a scrambled data stream 16. The shift register is initialized with a pre-set 11-bit sequence (for example 11111111111).

For transmission over the channel 20 the scrambled payload data stream is split into consecutive blocks of n binary digits, where n is an even number, starting with the leftmost bit of the data stream, and each block is encoded by a block encoder 16 (described in more detail below) into a respective block of n+2 binary digits. Each successive binary digit supplied by the encoder 16 is then converted into an optical signal by an optical transmitter 18 for transmission over the optical fibre channel 20. The binary symbols are represented herein by 0 (typically a zero-volt signal in the circuitry supplying the transmitter 18 and a low light-intensity signal on the channel 20), and 1 (typically a positive or negative polarity signal in the circuitry and a high light-intensity signal on the channel 20).

A significant parameter of the codes discussed below is the running digital sum (RDS) or disparity, which is related to the d.c. balance in electrical circuitry carrying the encoded blocks. In the case of a binary signal, the RDS is the difference between the accumulated totals of binary ones and zeroes in the signal (i.e. treating binary 0 as being opposite in polarity to binary 1).

Figure 3:
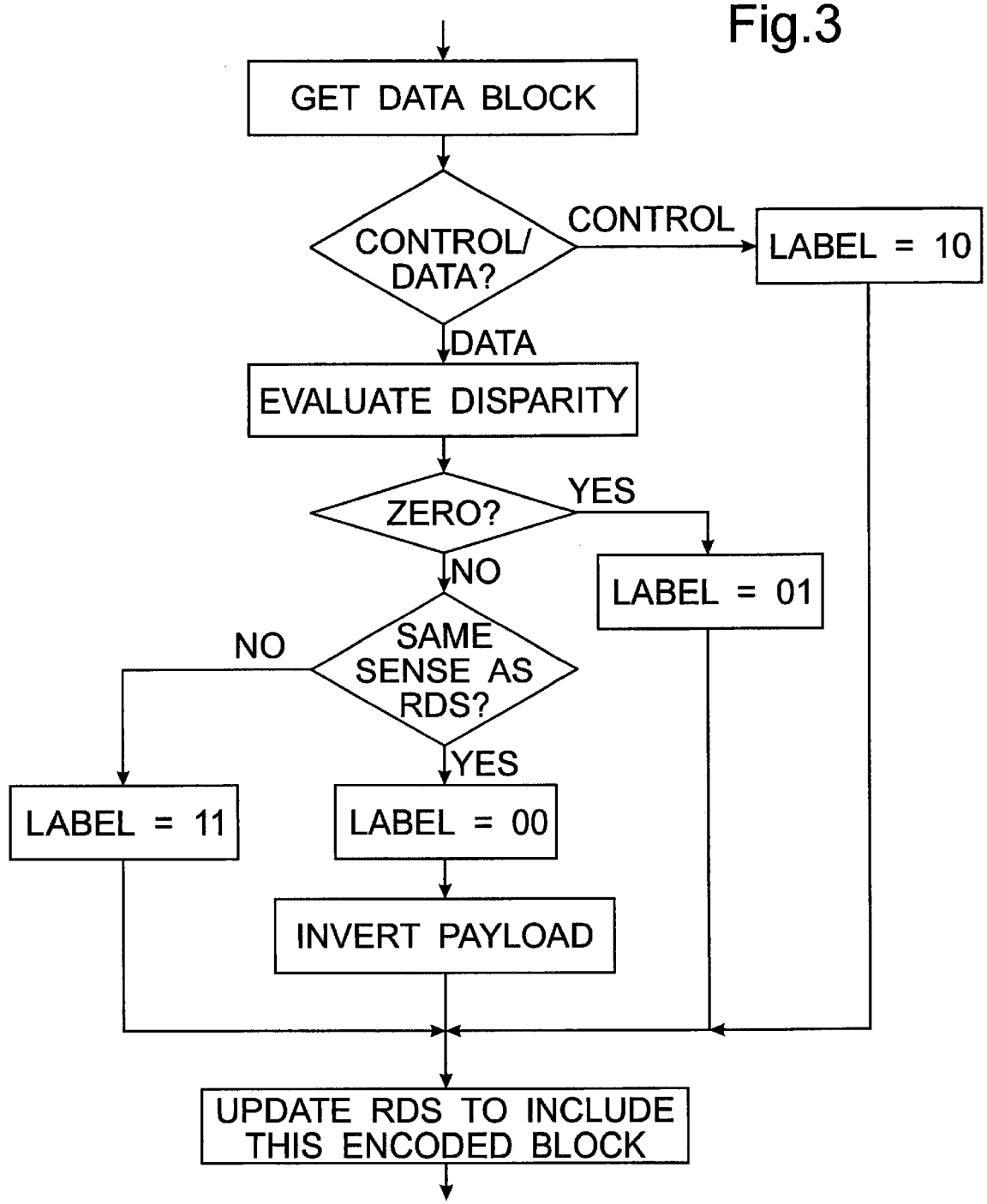
FIG. 3 is a flow diagram of a procedure for encoding data blocks according to the rules in the table in FIG. 2.

The block encoder 16 is arranged to encode the n-bit data blocks according to the rules shown in FIG. 2, and may be, for example, a 16B/18B encoder (n=16) in which case it converts sixteen-bit data blocks into eighteen-bit code blocks. The encoder may be implemented for example as a combinatorial logic hardware circuit or by a general-purpose processor operating in accordance with software or firmware program instructions; the procedure implemented by such instructions may for example be that shown in FIG. 3.

The rules shown in FIG. 2 are selected in part to limit the RDS of the encoded binary data stream and to maintain acceptable limits on maximum run length of sequences of the same binary value. To this end the encoder 16 updates a record of the RDS as each encoded block is generated, for comparison with the disparity of the next data block to be encoded. The result of this comparison determines the values of two "label" bits, a and b, which are added to the front of the data block (which itself may be inverted as described below) to generate the encoded block.

In the case of a payload block containing data (as distinct from control information), the disparity of the data block (i.e. the number of binary one digits—the number of binary zero digits) is determined:

if the disparity is non-zero and of equal sign to the running disparity at the end of the last coded block, then the content of the data block is inverted;

if the disparity is non-zero and of opposite sign to the running disparity at the end of the last coded block, then the data block is not inverted.

If the data block is inverted the label bits are set to 00; non-inversion is indicated by setting the label bits to 11. As a result of the selective inversion, and the corresponding choice of values for the label bits, the running disparity is bounded.

If the disparity of a data block is zero (i.e. equal numbers of binary one and zero digits), the data block is not inverted and the label bits a and b are set to 0 and 1 respectively to indicate that the payload has zero disparity. It will be noted that the label pair value 01 also has zero disparity, so the complete encoded block has zero disparity and does not alter the RDS of the encoded symbol stream.

Control information is conveyed by using selected n-bit data block values, together with a distinctive value of 10 for the pair of label bits a and b to indicate that the associated data block represents control information rather than actual data. The data block values used for this purpose are selected to be values which inherently have a disparity of zero, such as (for 8-bit blocks) 00001111 or 10101010. It will be noted that the label bit pair value 10 likewise has zero disparity, so the complete encoded block also has zero disparity.

In the case when the data block has disparity −2 (i.e. two fewer ones than zeros) and the RDS is <=0, the data block is inverted resulting in a disparity of +2. However, the label bits are set to 00 resulting in the disparity of the coded block becoming zero. This example illustrates that data block inversion does not always reduce the absolute value of the RDS, but does prevent the absolute value of the RDS from increasing.

In order to avoid cases where the RDS is zero, it is initialized to either +1 or −1 when the system is powered up; as all coded blocks have even length and therefore even disparity, the RDS can then never become zero at a coded block boundary.

Figure 4:
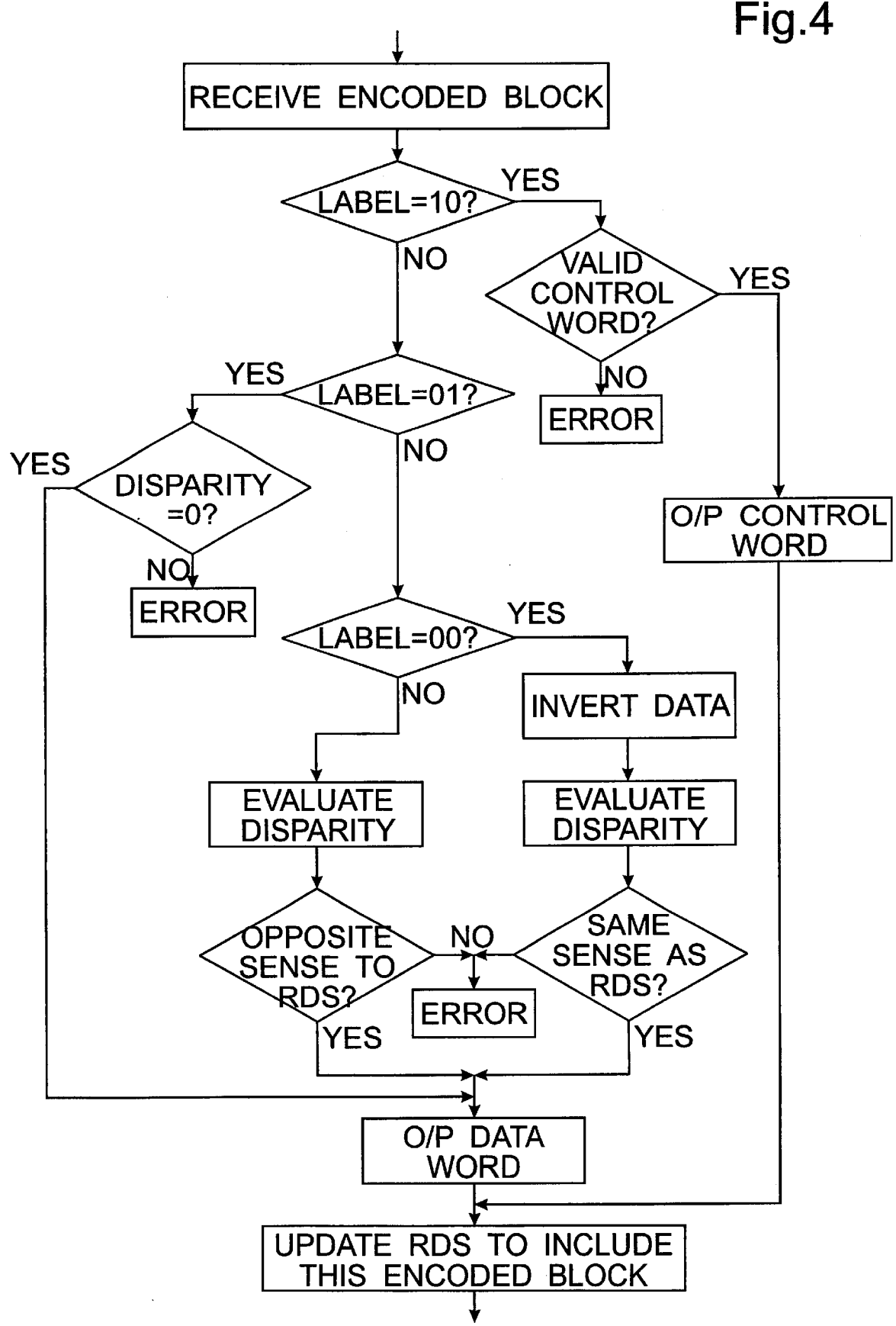
FIG. 4 is a flow diagram of a procedure for decoding code blocks encoded according to these rules.

The encoded blocks are transmitted over the optical fibre channel 20 (leftmost symbol first), and upon receipt at their destination they are detected by a receiver 22 where compensation is made in known manner for the effects of timing drift and other signal degradation to produce a restored digital data stream. The encoded data are then supplied to a block decoder 24 which derives the 16-bit data word corresponding to each 18-bit encoded block and performs initial error checks; this may be accomplished for example using the procedure of FIG. 4.

If any of the initial error checks fails, the decoder 24 determines that an error has occurred during transmission of the data frame and the entire frame is rejected. Otherwise the decoder 24 passes the decoded data to a de-scrambler 26 which reverses the scrambling effected by the scrambler 14. This is accomplished by generating a PRBS, and combining successive bits of this PRBS with successive bits of the decoded data stream in an exclusive-OR operation, in the same manner as described for the scrambler 14.

The descrambled data stream is passed to a CRC check circuit 28 which assembles the complete data frame and recalculates the CRC value for comparison with the transmitted CRC value. Assuming the CRC check does not reveal any corruption of the data, the frame is then available for further processing and use.

The properties of a code implemented according to the rules in FIG. 2 are as follows:

the code overhead is 2 bits for each n bits i.e. the efficiency is (n−2)/n*100%; it is believed that to reach a data rate of 2.5 Gb/s on a single optical channel (which could be one of four channels in a 10 Gb/s wavelength-division multiplexed link) CMOS technology will be stretched to the limit of its performance. A primary objective of this code is therefore to ensure that as little increase in speed as possible results from coding the data, and some compromise in relation to other properties have been accepted to attain this result.

byte alignment: the input to the encoder can be arranged to align naturally with byte-wide data paths, by picking n to be a multiple of eight;

control space (i.e. number of available zero-disparity n-bit data words for encoding control information): this grows rapidly with n. e.g. for n=8 this number is 70, and for n=16 it is 12870; in practice a simple scheme which generates data words with zero disparity is to pick any n/2-bit symbol Y, and set the data word equal to the concatenation of Y and not(Y); for n=16 this provides 256 control states;

error detection: errors may be classified as those affecting the payload field (data or control information) and those affecting the label field:

a single error in a payload field results in a single error in the decoded data;

a single error in the label field will always be detected as it will result in a label associated with a zero-disparity payload being created for a non-zero disparity payload or vice versa;

a single error in a control payload field will always be detected as it will result in a non-zero control payload disparity, which violates the design of the code;

a single error in the label field combined with a single error in the associated data payload field can result in either a single error in the decoded data (label 01 changed to label 11, payload error changes payload disparity to non-zero or vice versa), or can result in all n decoded data bits being complemented (label 01 changed to label 00, payload error changes payload disparity to non-zero or vice versa);

a single error in the label field combined with a single error in the associated control payload field can result in the control payload being mistakenly decoded as data (label 10 changed to label 11, payload error changes payload disparity to non-zero or vice versa);

two errors in the label field associated with a data payload will result in all n decoded data bits being complemented (label field 11 changed to 00 or vice versa), or will result in the data payload being mistaken for a control payload (label field 01 changed to 10);

two errors in the label field associated with a control payload will result in the control information being misinterpreted as data (label field 10 changed to 01); in summary, a single error anywhere in the coded block is either detected or results in a single error in the decoded data; two errors anywhere in the coded block can result in either a single decoded data error, or a complemented decoded data payload, or a data payload being mistaken for control information, or vice versa;

d.c. balance and maximum run length: the RDS is constrained to ±(1.5n+2) (or ±(n+1) at a coded block boundary), and the maximum run length is 2.5n+2; for the case when n=16, the maximum run-length is 42; clearly this is relatively large, but it permits high coding efficiency, and simplicity; it is also much less than the 72-symbol run length allowed by the test sequence for SONET/SDH systems;

the code is extremely simple to implement; no coding logic or lookup table is required, other than to calculate the disparity of each payload block and invert it when necessary.

A summary of these properties is presented in FIG. 5.

A common error detection requirement is that three single bit errors occurring in a packet should be detectable. The mechanisms available for detecting errors are the code itself and the 32-bit CRC32 check used in the medium access control (MAC) protocol of the IEEE 802.3 (Ethernet) standard. The CRC32 check will detect up to and including three single errors in an Ethernet packet. Since the code described here does not multiply errors that occur in the payload field, the CRC check can be relied upon to detect up to three errors occurring in the payload fields only.

As described above, any single error occurring in a label field is immediately detected by the code itself unless an error also occurs in the data payload associated with that label. However, the data error is then not multiplied by the coding. Therefore any combination of up to three single errors, where at most one error occurs in a particular label field, will be detected by a combination of the code and the CRC check.

If two errors occur in a label field, the payload may be misinterpreted as a control payload. This could result in a false packet delimiter or an unexpected control event.

The two label field errors may also cause the complete data payload to be corrupted. The payload is actually perfectly complemented. In some circumstances this error event is also detected by CRC check. For example, if n is less than or equal to 32, then the error event will constitute a burst of length 32 or less which will be detected by the CRC32 check. However, a third error elsewhere in the packet may not be detected.

If a CRC check is used which is capable of detecting one other single error when a byte aligned portion of length n (n=16, 32 say) of the packet is perfectly complemented, then all three error combinations can be detected.

Another way to meet the error detection objective would be to use packet end delimiters to check that the number of 11 or 00 label fields received is correct (i.e. a parity check on the 00/11 labels), since double errors in these label fields cause the error bursts.

Two distinct end delimiters would be needed to indicate whether an odd or even number of 00 label fields has been transmitted during a packet. Four errors would then be needed (two inverted label fields) to defeat the error detection mechanism. In view of the generous control space available for n=16, 32, such end delimiters could easily be constructed.

The code can be used with a scrambler. To avoid error multiplication the scrambler must scramble the payload before encoding. There are several scrambling options:

frame synchronous: for this the scrambler is reset on every frame, so in the case of many short frames the scrambling properties may not be fully realised;

free running: the receiver acquires synchronisation with the transmitter scrambler during a start-up phase and then all subsequent traffic (packets and control) is scrambled;

a distributed sample scrambler implemented by including a scrambler status bit in each control payload; this would allow a receiver to continuously check its descrambler state.

There are many potential ways to achieve code block synchronization (i.e. correct alignment in the receiver of the label and payload fields). For example, one technique would be to transmit a 'comma sequence' during start-up. As an example of this technique consider a code with n=8 using the simple control payload scheme. A training control state of 1111 1111 would be transmitted as:

[10 1111 1111 0000 0000][10 1111 1111 0000 0000][10 1111 1111 0000 0000]

The receiver searches for the bit pair 10. This is found in only two locations: the correct location (the label field), and at the end of the run of eight 1's. However, if the receiver (incorrectly) identifies the label field to be the 10 bit pair at the end of the run of 1's, the following 16 bits are not a valid control payload (first 8 bits are not the complement of the second 8 bits). The receiver can therefore detect the mistake. It is also noted that this sequence contains a regular 010 pattern, which aids in phase-locked loop (PLL) clock acquisition.

The code described above is compatible with bandwidth-efficient line coding techniques such as partial response encoding and carrier-less amplitude and phase modulation (CAP-4). If the optical and electrical components used are compatible with these modulation techniques then this feature provides an extra degree of freedom in system design. The extra degree of freedom can be used to reduce the bandwidth requirements of the link components or maximise link length at the expense of implementing either a three-level transmission system or a transmission system using two orthogonal binary on-off channels.

We claim:

1. A method of encoding payload bits for transmission over a communications link such that the running disparity of the transmitted symbol stream is constrained within a predetermined limit, and said payload bits comprising either data or control information, comprising the steps of:

assembling an even number of payload bits into a data block, said payload bits being constrained to have zero disparity in the case where they comprise control information;

deriving the disparity of the data block;

if the disparity of the data block is non-zero and of the same sense as the running disparity of the transmitted symbol stream, inverting the bits in the data block and assigning a first value to a plurality of label bits;

if the disparity of the data block is non-zero and of opposite sense to the running disparity of the transmitted symbol stream, assigning a second value to the plurality of label bits;

if the disparity of the data block is zero and the payload bits constitute data, assigning a third value to the plurality of label bits;

if the payload bits comprise control information, assigning a fourth value to the plurality of label bits; and transmitting the payload and label bits in the symbol stream and deriving the running disparity of the transmitted symbol stream.

2. The method of claim 1, wherein there are a pair of label bits, and the first, second, third and fourth values are 00, 11, 01 and 10 respectively.

* * * * *